(12) United States Patent
Parviainen

(10) Patent No.: US 10,491,066 B2
(45) Date of Patent: Nov. 26, 2019

(54) METHOD AND ARRANGEMENT FOR ADJUSTING THE MAGNETIZATION OF A PERMANENT MAGNET MACHINE

(71) Applicant: DANFOSS EDITRON OY, Lappeenranta (FI)

(72) Inventor: Asko Parviainen, Lappeenranta (FI)

(73) Assignee: DANFOSS EDITRON OY, Lappeenranta (FI)

( * ) Notice: Subject to any disclaimer, the term of this patent is extended or adjusted under 35 U.S.C. 154(b) by 83 days.

(21) Appl. No.: 15/735,763

(22) PCT Filed: Jun. 8, 2016

(86) PCT No.: PCT/FI2016/050407
§ 371 (c)(1),
(2) Date: Dec. 12, 2017

(87) PCT Pub. No.: WO2016/203101
PCT Pub. Date: Dec. 22, 2016

(65) Prior Publication Data
US 2018/0183287 A1 Jun. 28, 2018

(30) Foreign Application Priority Data
Jun. 16, 2015 (FI) ...................................... 20155467

(51) Int. Cl.
*H02K 1/32* (2006.01)
*H02K 9/00* (2006.01)
(Continued)

(52) U.S. Cl.
CPC ............. *H02K 1/2766* (2013.01); *H02K 9/02* (2013.01); *H02K 15/03* (2013.01); *H02K 21/028* (2013.01);
(Continued)

(58) Field of Classification Search
CPC ........ H02K 15/03; H02K 1/2766; H02K 1/32; H02K 21/028; H02K 21/042; H02K 2201/03; H02K 2213/09; H02K 9/02
(Continued)

(56) References Cited

U.S. PATENT DOCUMENTS 5,159,220 A * 10/1992 Kliman ................. H02K 1/2766
310/156.56
8,952,591 B2 * 2/2015 Ramu ...................... H02K 1/24
310/216.075
(Continued)

FOREIGN PATENT DOCUMENTS

CN 101527470 A 9/2009
CN 102170210 A 8/2011
(Continued)

OTHER PUBLICATIONS

Chun-Yan et al. "Research on Interpolar Leakage Coefficient of PMSM with Variable Magnetic Reluctance in the Exciting Circuit". Julkaisussa IEEE Vehicle Power and Propulsion Conference (VPPC), Sep. 3-5, 2008, Harbin, China.
(Continued)

*Primary Examiner* — Yuriy Semenenko
(74) *Attorney, Agent, or Firm* — Nath, Goldberg & Meyer; Jerald L. Meyer; Stanley N. Protigal

(57) ABSTRACT

The invention relates to a method and to an arrangement for adjusting the magnetization of a permanent magnet machine, i.e. the magnetic flux induced by permanent magnets of a rotor in a stator, i.e. the air gap flux. According to the invention, the air gap flux is adjusted by adjusting the leakage flux of the permanent magnet.

6 Claims, 3 Drawing Sheets

(51) Int. Cl.
*H02K 9/06* (2006.01)
*H02K 1/27* (2006.01)
*H02K 9/02* (2006.01)
*H02K 15/03* (2006.01)
*H02K 21/04* (2006.01)
*H02K 21/02* (2006.01)

(52) U.S. Cl.
CPC ............ *H02K 21/042* (2013.01); *H02K 1/32* (2013.01); *H02K 2201/03* (2013.01); *H02K 2213/09* (2013.01)

(58) Field of Classification Search
USPC .......... 310/181, 154.02, 156.17, 156.24, 190
See application file for complete search history.

(56) References Cited

U.S. PATENT DOCUMENTS

| | | | | |
|---|---|---|---|---|
| 9,041,261 | B2* | 5/2015 | Yamamoto | H02K 1/2766 310/156.53 |
| 2007/0096586 | A1* | 5/2007 | Cros | H02K 1/14 310/216.059 |
| 2010/0127584 | A1* | 5/2010 | Gottfried | H02K 1/2766 310/61 |
| 2012/0248907 | A1* | 10/2012 | Chang | H02K 9/20 310/61 |
| 2013/0307358 | A1* | 11/2013 | Parviainen | H02K 1/223 310/61 |
| 2015/0263590 | A1* | 9/2015 | Wetzel | H02K 1/276 310/61 |
| 2018/0233974 | A1* | 8/2018 | Shi | H02K 1/246 |

FOREIGN PATENT DOCUMENTS

| | | |
|---|---|---|
| CN | 103208893 A | 7/2013 |
| CN | 103051134 B | 8/2015 |
| JP | 5544738 B2 | 5/2014 |

OTHER PUBLICATIONS

Shanming et al. "State of the Art of Hybrid Excitation Permanent Magnet Synchronous Machines". Julkaisussa International Conference on Electrical Machines and Systems (ICEMS), Oct. 10-13, 2010, Incheon, South Korea.

Finnish Search Report dated Jan. 20, 2016 corresponding to application No. 20155467.

Extended Search Report dated Jan. 24, 2019 issued in corresponding European Application No. 16811081.5.

* cited by examiner

METHOD AND ARRANGEMENT FOR ADJUSTING THE MAGNETIZATION OF A PERMANENT MAGNET MACHINE

This is a National Phase Application filed under 35 U.S.C. 371 as a national stage of PCT/FI2016/050407, filed Jun. 8, 2016, an application claiming the benefit of Finnish Application No. 20155467, filed Jun. 16, 2015, the content of each of which is hereby incorporated by reference in its entirety.

FIELD OF THE INVENTION

The invention relates to a method and to a corresponding arrangement for adjusting the magnetization of a permanent magnet machine.

BACKGROUND OF THE INVENTION

In permanent magnet synchronous machines it is common to use laminated rotor structures, i.e. disc rotors, wherein the actual body of the rotor around the shaft is made of a large number of identically shaped thin ferromagnetic metal discs which are stacked together as a tight assembly.

The ferromagnetic disc stack forms a good body for the rotor around the magnets, but particularly in large machines, heating of the rotor and, importantly, of the magnets may cause problems. Other problems besides heating include leakage fluxes of the magnets and the armature reaction, i.e. the magnetic flux tends to move crosswise at the rotor pole, which is not a desirable effect.

These problems have been overcome or at least reduced in the prior art laminated rotor structure of a permanent magnet machine, in which discs of a ferromagnetic material form the body of the rotor. The body is provided with bars of a damper winding that extend axially from one end of the body to the other in proximity to the surface and, on the inner side of the frame formed by the bars, with a circular arrangement of permanent magnets in V-formation. First ends of the permanent magnets are close to the outer perimeter of the rotor, while their second ends are closer to the central shaft of the rotor.

Two permanent magnets thus form a pair of permanent magnets in which the magnets are angled relative to each other, their first ends spaced apart from each other and their second ends in proximity to each other. Further, the structure comprises an air channel which extends in the axial direction through the laminar structure of the rotor and which is disposed in direct heat transfer contact with the second ends of the magnets in the pair of magnets. This way, the air flow in the air channel effectively cools the laminate structure and thereby the permanent magnets, and also directly the second end of the permanent magnets which is in direct heat transfer communication with the air flow.

Permanent magnet machines are basically fixedly magnetized, i.e. fixedly driven, which means that their magnetization cannot be adjusted as can be done with traditional synchronous machines. However, in certain applications such as in power generation there exists a need also to adjust, to some degree, the magnetization of a permanent magnet synchronous machine, and thereby the reactive power produced by the machine. This could be theoretically accomplished by adjusting the main magnetic flux of the permanent magnets. However, in practice this is not preferred because, in the case of a permanent magnet synchronous machine, an adjustment coupled in series with the main flux requires high magnetization power and thereby generates a great deal of heat, which is difficult to be conducted away from the proximity of the magnet. An adjustment implemented in this manner would weaken the performance, particularly efficiency, of the machine, as well as the magnetic properties of the magnet.

OBJECTIVE OF THE INVENTION

The objective of the invention is to remedy the defects of the prior art described above. Specifically, the objective of the invention is to disclose a new adjustment method which makes it possible to adjust the magnetization in a permanent magnet synchronous machine.

SUMMARY OF THE INVENTION

In the method according to the invention, the magnetic flux induced by the magnetization of a permanent magnet machine, i.e. induced by permanent magnets of a rotor in a stator, i.e. the main flux, or air gap flux, is adjusted. According to the invention, the air gap flux is adjusted by adjusting the leakage flux of the permanent magnet.

In one embodiment of the invention, the leakage flux of the permanent magnets is adjusted by adjusting the reluctance of the leakage flux circuit of the rotor, i.e. the magnetic resistance.

In one embodiment of the invention, the leakage flux is adjusted by changing the mechanical structure of the leakage flux circuit so as to change the reluctance of the leakage flux circuit of the rotor.

In one embodiment of the invention, the leakage flux is adjusted by adjusting an electromagnet disposed in the leakage flux circuit.

The invention also relates to an arrangement for adjusting the magnetization of a rotor of a permanent magnet machine. In the rotor of the permanent magnet machine, the permanent magnets are disposed in annular V-formation inside the rotor body in such a way that first ends of the permanent magnets are close to the rotor surface, while second ends of the permanent magnets are closer to the central shaft of the rotor, so that the second ends of the permanent magnets are disposed in heat transfer contact with an air channel that extends in the axial direction through the rotor. According to the invention, the air channel comprises an adjusting arrangement for adjusting the leakage flux of the permanent magnet that circulates the air channel.

In one embodiment of the invention said air channel comprises, in the radial direction of the rotor, a ferromagnetic partition which divides the air channel into two channel sections, the adjusting arrangement according to the invention being provided at the partition.

In one embodiment of the invention the adjusting arrangement comprises an adjustment member which is turnable in the area of the partition, i.e. a mechanical structure for adjusting the reluctance of the partition. Another mechanical adjustment embodiment according to the invention is an adjustment member that is movable in the axial direction of the rotor, i.e. an adjustment bar that is movable in its longitudinal direction.

In a third embodiment of the invention, the adjusting arrangement comprises an electromagnet disposed in the area of the partition.

ADVANTAGES PROVIDED BY THE INVENTION

The method and the arrangement according to the invention have considerable advantages over the prior art. By means of the invention, it is possible to adjust the air gap flux of the machine produced by the permanent magnets of the rotor of the permanent magnet synchronous machine without compromising the properties of the magnets by overheating and in such a way that the power requirement of the adjustment remains quite low, whereby it is possible to have high efficiency for the machine.

BRIEF DESCRIPTION OF THE DRAWINGS

The invention will now be described in detail with reference to the accompanying drawings, in which.

DETAILED DESCRIPTION OF THE INVENTION

Figure 1:
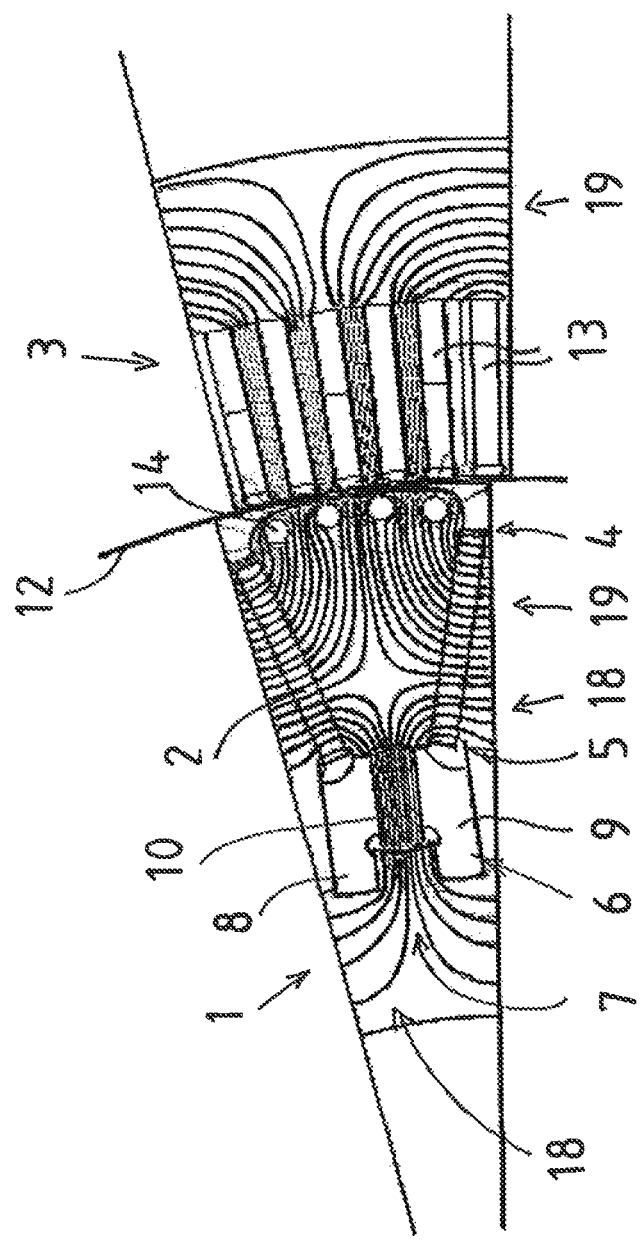
FIG. 1 shows one embodiment of the invention in a first position.
Figure 2:
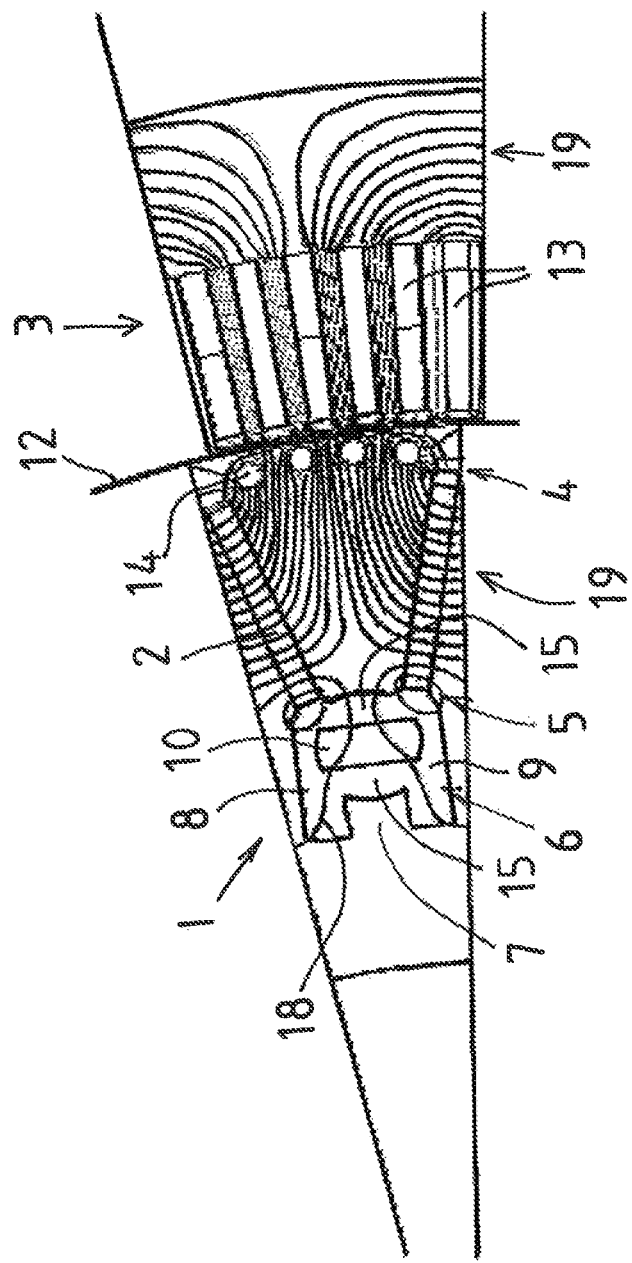
FIG. 2 shows the embodiment of FIG. 1 in a second position.

FIGS. 1 and 2 show one embodiment of the invention as a section of one sector or pole of a machine showing part of a rotor 1 and a stator 3 as well as an air gap 12 between them. The stator 3 comprises a stator winding 13. The rotor 1 comprises, in proximity to its outer surface inside the rotor, a number of bars 14 of a damper winding which are usually made of copper and which are connected, in a known manner, with shorting rings made of copper at both ends of the rotor. On the inner side of the circular arrangement formed by the bars 14 there is a circular arrangement of permanent magnets 2 in V-formation. First ends 4 of the permanent magnets are close to the outer perimeter of the rotor, and their second ends 5 are closer to the central shaft of the rotor. Two permanent magnets 2 are disposed at an angle, and they form a pair of permanent magnets in which their first ends 4 are spaced apart from each other, while their second ends 5 are closer to each other.

Also, the second ends 5 of the pair of permanent magnets are disposed in direct heat transfer communication with an air channel 6 that extends in the axial direction through the laminar structure of the rotor. The air channel 6 is formed by two channel sections 8 and 9, and between the channel sections in the radial direction of the rotor 1 there is a partition 7. The partition 7 is not one-piece, but comprises an adjustment member 10 that is turnable relative to the rest of the partition. In another embodiment of the invention this adjustment member is movable in the axial direction, which brings the same result, i.e. adjustment of the reluctance of the leakage flux circuit. The adjustment member 10 extends over the entire axial length of the rotor, its width is approximately equal to the width of the partition and, in the radial direction, its length is greater than its width. Thus, in the position of FIG. 1 it forms a nearly continuous partition structure with the rest of the structure between the channel sections 8 and 9. However, when turned by 90° as shown in FIG. 2, clear gaps 15 are formed in the partition by means of the adjustment member 10, which notably changes the reluctance of the rotor structure. Thus, according to the invention the mechanical turnable structure is used to change the reluctance of the leakage flux circuit of the permanent magnet and thereby to adjust the main flux of the permanent magnet.

The main flux of the permanent magnet 2 passes through the permanent magnet and the stator 3, and the leakage flux circulates around the channel sections 8 and 9 through the partition 7 inside the rotor 1. In the machine according to the invention, the main flux of the machine can be simply adjusted by adjusting the leakage flux inside the rotor with the above described arrangement. I.e. according to the invention, when the reluctance of the leakage flux circuit is increased, the leakage flux is reduced and accordingly the main flux is amplified. In other words, FIG. 1 shows the flux lines when the reluctance of the mechanically adjusted partition is at its minimum. At this point, the leakage flux 18 of the permanent magnets 2 is at its maximum and the main flux 19 they provide is at its minimum, whereby the voltage induced in the stator winding 13 is at its minimum. FIG. 2, on the other hand, shows the flux lines when the reluctance of the mechanically adjusted partition is at its maximum. At this point, the leakage flux 18 of the permanent magnets 2 is at its minimum and their main flux 19 is at its maximum, whereby the voltage induced in the stator winding 13 is at its maximum.

Figure 3:
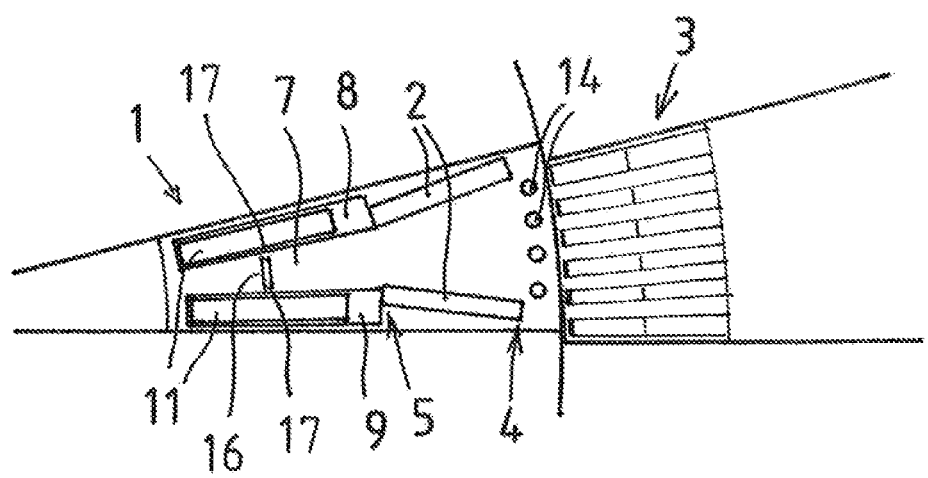
FIG. 3 shows another embodiment of the invention.

FIG. 3 illustrates another embodiment of the invention, wherein the structure with its numbering is in other respects the same, but the adjustment according to the invention is not performed mechanically but electrically. An electromagnet 11 is in this case provided in the rotor 1, in a radially inward direction after the second ends 5 of the permanent magnets 2 and the channel sections 8 and 9, through which electro-magnet the leakage flux of the permanent magnets 2 circulates. A transverse air gap 16 cuts greater part of the partition 7 disposed in the middle of the electromagnet 11, by virtue of which air gap the reluctance of the leakage flux circuit can be adjusted to be suitable for electrical magnetization. In some embodiments according to the invention, the air gap 16 is not necessary. On both sides of the air gap 16 there are only narrow strips 17 which give mechanical support for the rotor pole in the radial direction. The leakage flux that runs through the partition 7 can be adjusted by means of the electromagnet 11, and so the main flux that runs through the permanent magnets 2 and the stator 3 of the permanent magnet synchronous machine can be adjusted thereby.

The invention has been described above by way of example with reference to the accompanying drawings, different embodiments of the invention being possible within the scope defined by the claims.

The invention claimed is:

1. An arrangement for adjusting magnetization of a rotor of a permanent magnet machine, the rotor comprising a rotor body, an outer surface, and a central shaft, in which rotor permanent magnets are disposed inside the rotor body in annular V-formation, first ends of the permanent magnets being close to the outer surface of the rotor and second ends of the permanent magnets being closer to the central shaft of the rotor in such a way that the second ends of the permanent magnets are disposed in heat transfer contact with an air channel that extends in an axial direction through the rotor, wherein the arrangement is in the air channel and constitutes at least a part of a ferromagnetic partition in a radial direction of the rotor so that the ferromagnetic partition divides the air channel into two channel sections, and the arrangement comprises an adjustment member in the ferromagnetic partition so that a position of the adjustment member is changeable with respect to the rotor body for adjusting a reluctance of the ferromagnetic partition so as to adjust a leakage flux of the permanent magnets.

2. The arrangement according to claim 1, wherein the adjustment member is turnable with respect to the rotor body for adjusting the reluctance of the ferromagnetic partition.

3. The arrangement according to claim 1, wherein the adjustment member is movable in the axial direction with respect to the rotor body for adjusting the reluctance of the ferromagnetic partition.

4. A method for adjusting magnetization of a rotor of a permanent magnet machine, the rotor comprising a rotor body, an outer surface, and a central shaft, in which rotor permanent magnets are disposed inside the rotor body in annular V-formation, first ends of the permanent magnets being close to the outer surface of the rotor and second ends of the permanent magnets being closer to the central shaft of the rotor in such a way that the second ends of the permanent magnets are disposed in heat transfer contact with an air channel that extends in an axial direction through the rotor, wherein the rotor comprises, in the air channel, an adjusting arrangement for adjusting a leakage flux of the permanent magnets, the adjusting arrangement constituting at least a part of a ferromagnetic partition in a radial direction of the rotor so that the ferromagnetic partition divides the air channel into two channel sections, the method comprising adjusting the leakage flux of the permanent magnets by changing, in the ferromagnetic partition, a position of an adjustment member of the adjusting arrangement with respect to the rotor body to adjust a reluctance of the ferromagnetic partition.

5. The method according to claim 4, wherein the adjustment member is turned with respect to the rotor body for adjusting the reluctance of the ferromagnetic partition.

6. The method according to claim 4, wherein the adjustment member is moved in the axial direction with respect to the rotor body for adjusting the reluctance of the ferromagnetic partition.

* * * * *